United States Patent [19]

Tatara et al.

[11] Patent Number: 5,151,853
[45] Date of Patent: Sep. 29, 1992

[54] CYCLOCONVERTER AND THE METHOD OF CONTROLLING THE SAME

[75] Inventors: Shinji Tatara; Masami Okayasu, both of Tokyo, Japan

[73] Assignee: Kabushiki Kaisha Toshiba, Kawasaki, Japan

[21] Appl. No.: 668,785

[22] Filed: Mar. 13, 1991

[30] Foreign Application Priority Data

Mar. 13, 1990 [JP] Japan ................................ 2-61529

[51] Int. Cl.⁵ .......................................... H02M 5/443
[52] U.S. Cl. ........................................ 363/160; 363/37
[58] Field of Search ............................ 363/159–164, 363/37

[56] References Cited

U.S. PATENT DOCUMENTS

| | | | |
|---|---|---|---|
| 4,349,867 | 9/1982 | Otsuka et al. | 363/160 |
| 4,570,214 | 2/1986 | Tanaka | 363/160 |
| 4,648,022 | 3/1987 | Schauder | 363/159 |
| 4,652,989 | 3/1987 | Kurosawa et al. | 363/161 |
| 4,674,026 | 6/1987 | Tanaka | 363/160 |
| 4,760,321 | 7/1988 | Tanaka et al. | 363/160 X |
| 4,764,859 | 8/1988 | Matsui et al. | 363/161 |

FOREIGN PATENT DOCUMENTS 2543066  5/1976  Fed. Rep. of Germany .

OTHER PUBLICATIONS

"A Multi-Processor-Based, Fully Digital, AC Drive System for Rolling Mills", Conference Record of the 1986 IEEE Industry Applications Society Annual Meeting, Part I, Keiji Saito et al., pp. 36–41.

Naohiko Kamiyama, "New Drive Electronics," Denki Shoin, p. 172, line 15 through p. 174, line 11 (cascade connection), no date.

1986 IEEE, Hiromi Hosoda et al., "A New Concept High-Performance Large-Scale AC Drive System", IEEE, pp. 229–234.

Primary Examiner—Emanuel T. Voeltz
Attorney, Agent, or Firm—Oblon, Spivak, McClelland, Maier & Neustadt

[57] ABSTRACT

A method of controlling a cycloconverter, for supplying an AC power having a given frequency to a converter group having at least two cascade-connected converters and controlling a firing angle of each of the converters, thereby converting the AC power supplied to the converter group into an AC power having a predetermined frequency, includes the steps of controlling an output voltage from a converter in one stage of the converter group to obtain an AC output voltage including a synthetic voltage of an AC voltage having an amplitude equal to a difference between a maximum output voltage of the converter and a DC voltage and a predetermined DC voltage in accordance with the polarity of a reference voltage signal having a predetermined frequency, controlling an output voltage from a converter in the other stage of the converter to obtain an AC output voltage obtained by subtracting the output from of the converter in one stage from the reference voltage signal, and continuously varying a voltage value of the DC voltage in accordance with the frequency of the reference voltage signal.

11 Claims, 6 Drawing Sheets

F I G. 4A
$V_C = E\alpha$
$|\omega r| < \omega\alpha$

F I G. 4B
$0 < V_C < E\alpha$
$\omega\alpha < |\omega r| < \omega\beta$

F I G. 4C
$V_C = 0$
$\omega\beta \leq |\omega r|$

CYCLOCONVERTER AND THE METHOD OF CONTROLLING THE SAME

BACKGROUND OF THE INVENTION

1. Field of the Invention

The present invention relates to a cycloconverter for converting an AC power having a given frequency into an AC power having an arbitrary frequency and the method of controlling the same.

2. Description of the Related Art

A two-stage-cascade cyclic-current cycloconverter for driving an induction motor will be described below.

Figure 6:
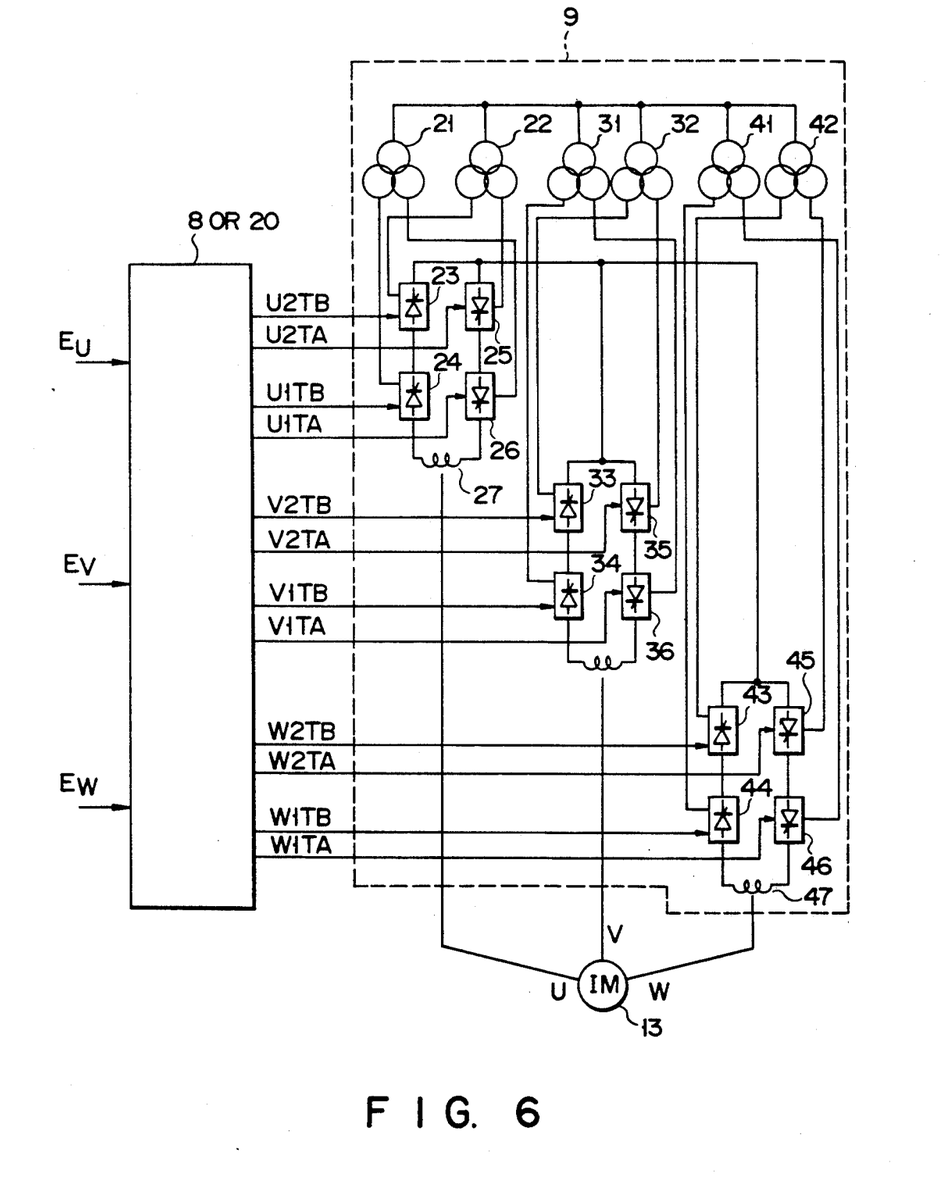
FIG. 6 is a main circuit diagram of a cycloconverter.

FIG. 6 shows an arrangement of a main circuit of this cycloconverter.

A main circuit 9 of the cycloconverter has U-, V-, and W-phase converter units in correspondence with U, V, and W phases of an induction motor 13, respectively. In the U-phase converter unit, positive converters 23 and 24 for flowing a positive component of an AC output current are two-stage-cascade-connected to negative converters 25 and 26 for flowing a negative component of the output AC current, and transformers 21 and 22 are connected to the converters 24 and 26 in the first stage and the converters 23 and 25 in the second stage, respectively. The U-phase converter unit further includes a reactor 27 for suppressing a cyclic current.

The V-phase converter unit is constituted by connecting transformers 31 and 32, positive converters 33 and 34, negative converters 35 and 36, and a reactor 37 in the same manner as in the U-phase converter unit. The W-phase converter unit is constituted by connecting transformers 41 and 42, positive converters 43 and 44, negative-converters 45 and 46, and a reactor 47 in the same manner as in the U-phase converter unit.

Outputs from the U-, V-, and W-phase converter units of the main circuit 9 are connected to the induction motor 13.

In the cycloconverter having the above arrangement, firing signals generated by an asymmetrical controller 20 are supplied to the positive and negative converters of each of the U-, V-, and W-phase converter units. For example, firing signals U1TB and U1TA for determining an output voltage U1S are supplied to the converters 24 and 26, respectively, in the first stage of the U-phase converter unit, and firing signals U2TA and U2TB for determining an output voltage U2S are supplied to the converters 23 and 25, respectively, in its second stage.

The two converters of each of the positive and negative groups output equal voltages at the same time upon application of the firing signals, and an average voltage V of the voltage outputs from the two converters is supplied to the induction motor 13. This average voltage V is given by the following equation:

$$V = (U1S + U2S)$$
$$= (1/2)(U1SA + U2SB) + (1/2)(U2SA + U2SB)$$

Although effective values of the output voltages from the positive and negative converters are equal to each other, a cyclic current flows from the positive converters 23 and 24 to the negative converters 25 and 26 due to a differential voltage caused by output voltage waveforms. The level of the cyclic current is suppressed by the reactor 27 for cyclic current suppression. The foregoing goes for the V- and W-phase converter units.

Figure 7:
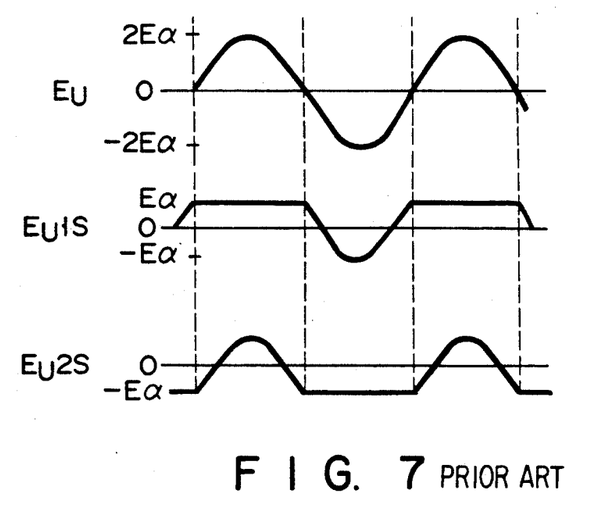
FIG. 7 is a timing chart for explaining an operation of a conventional cycloconverter.
Figure 8:
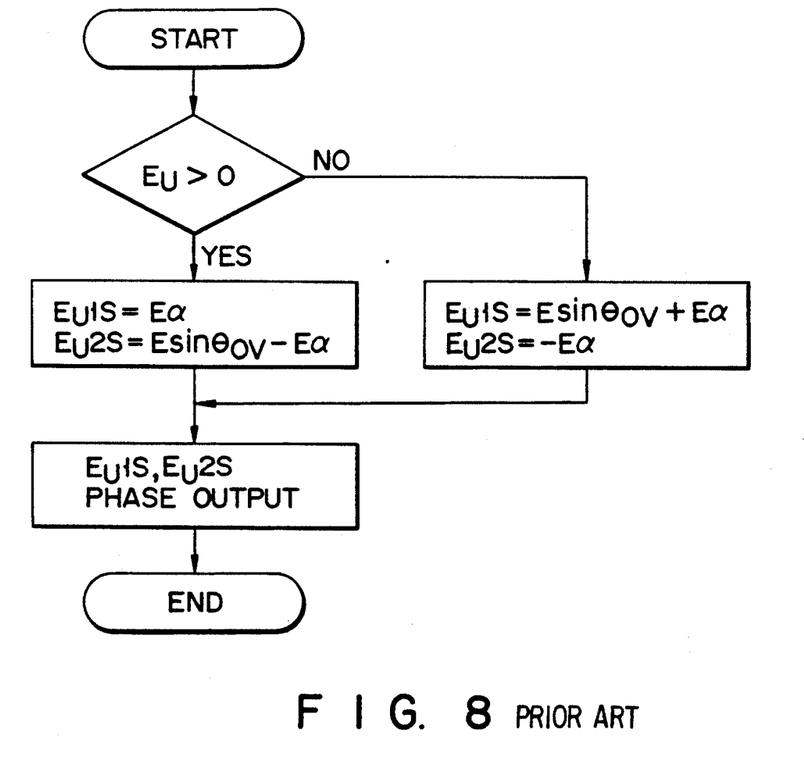
FIG. 8 is a flow chart for realizing asymmetrical control of the conventional cycloconverter.

The asymmetrical controller 20 will be described below. FIG. 7 shows waveforms of an output voltage $E_u1S$ from the positive and negative converters in the first stage, an output voltage $E_u2S$ from the positive and negative converters in the second stage, and a total output voltage $E_u$ of the U-phase converter unit. FIG. 8 is a flow chart for generating an output voltage reference.

In order to obtain the output voltages $E_u1S$ and $E_u2S$ in the corresponding stages of the U-phase converter unit, the two converters in each stage are controlled as follows. That is, the output voltage of the two converters in one stage is fixed at a maximum voltage $E\alpha$ of the converter, and the output voltage of the two converters in the other stage is so controlled as to obtain the total output voltage $E_u$ of the U-phase converter unit.

Converter output voltage references in the respective stages are obtained by the following equations. That is, if the total output voltage reference of the converter unit is $E_u > 0$:

1st-stage converter output voltage reference $$E1_u = E\alpha$$

2nd-stage converter output voltage reference $$E2_u = E\sin\theta ov - E\alpha$$

for $|E\sin\theta ov| \leq 2E\alpha$, where $E\alpha$ is the maximum output voltage of the converter. If the total output voltage reference of the converter unit is $E_u \leq 0$:

$$E_u1S = E\sin\theta ov + E\alpha$$

$$E_u2S = -E\alpha$$

By controlling the output voltages from the converters as described above, the voltage to be applied to the motor acquires a sine wave as indicated by the waveform $E_u$ shown in FIG. 7.

When the asymmetrical control as described above is performed, the converters in the first stage constantly generate the maximum voltage with a high input power factor. As compared with symmetrical control in which the same sine-wave output voltage is given to both the first and second stages, therefore, the input power factor can be largely improved.

The symmetrical control system can be applied with no problem when a frequency of the output voltage reference is low, i.e., in a low-speed operation range. If, however, a frequency is as high as 20 to 30 Hz or more, for example, an output voltage waveform in each stage for outputting the above asymmetrical control cannot be correctly output. As a result, no sine wave can be obtained as an output voltage to a motor, and a distortion in sine wave becomes a disturbance such as a torque ripple. The above asymmetrical control, therefore, can be applied in only a low-frequency range.

In order to realize a cycloconverter capable of driving a motor at a high speed and having a high input power factor, control must be performed such that the asymmetrical control is used to improve an input power factor as a cycloconverter in a low-speed range (at about a base speed) in which the input power factor is particularly degraded and the symmetrical control is used in a high-speed range to correctly supply an output waveform during a high-frequency operation.

SUMMARY OF THE INVENTION

It is an object of the present invention to provide a cycloconverter and the method of controlling the same capable of continuously, smoothly performing switching from asymmetrical to symmetrical control or vice versa in accordance with an operation range of a motor, thereby realizing a high-speed operation without disturbing an output voltage waveform, and having a high input power factor in a low-speed range.

The present invention is a method of controlling a cycloconverter, for supplying an AC power having a given frequency to a converter group having at least two cascade-connected converters and controlling a firing angle of each of the converters, thereby converting the AC power supplied to the converter group into an AC power having a predetermined frequency, comprising steps of controlling an output voltage from a converter in one stage of the converter group to obtain an AC output voltage including a synthetic voltage of an AC voltage having an amplitude equal to a difference between a maximum output voltage of the converter and a DC voltage and a predetermined DC voltage in accordance with the polarity of a reference voltage signal having a predetermined frequency, controlling an output voltage from a converter in the other stage of the converter group to obtain an AC output voltage obtained by subtracting the output of the converter in one stage from the reference voltage signal, and continuously varying a voltage value of the DC voltage in accordance with the frequency of the reference voltage signal.

According to the present invention as described above, since switching from asymmetrical to symmetrical control can be continuously, smoothly performed, an input power factor can be improved in a low-speed operation range, and a high-speed operation with good output characteristics can be realized without disturbing an output voltage waveform in a high-speed operation range.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
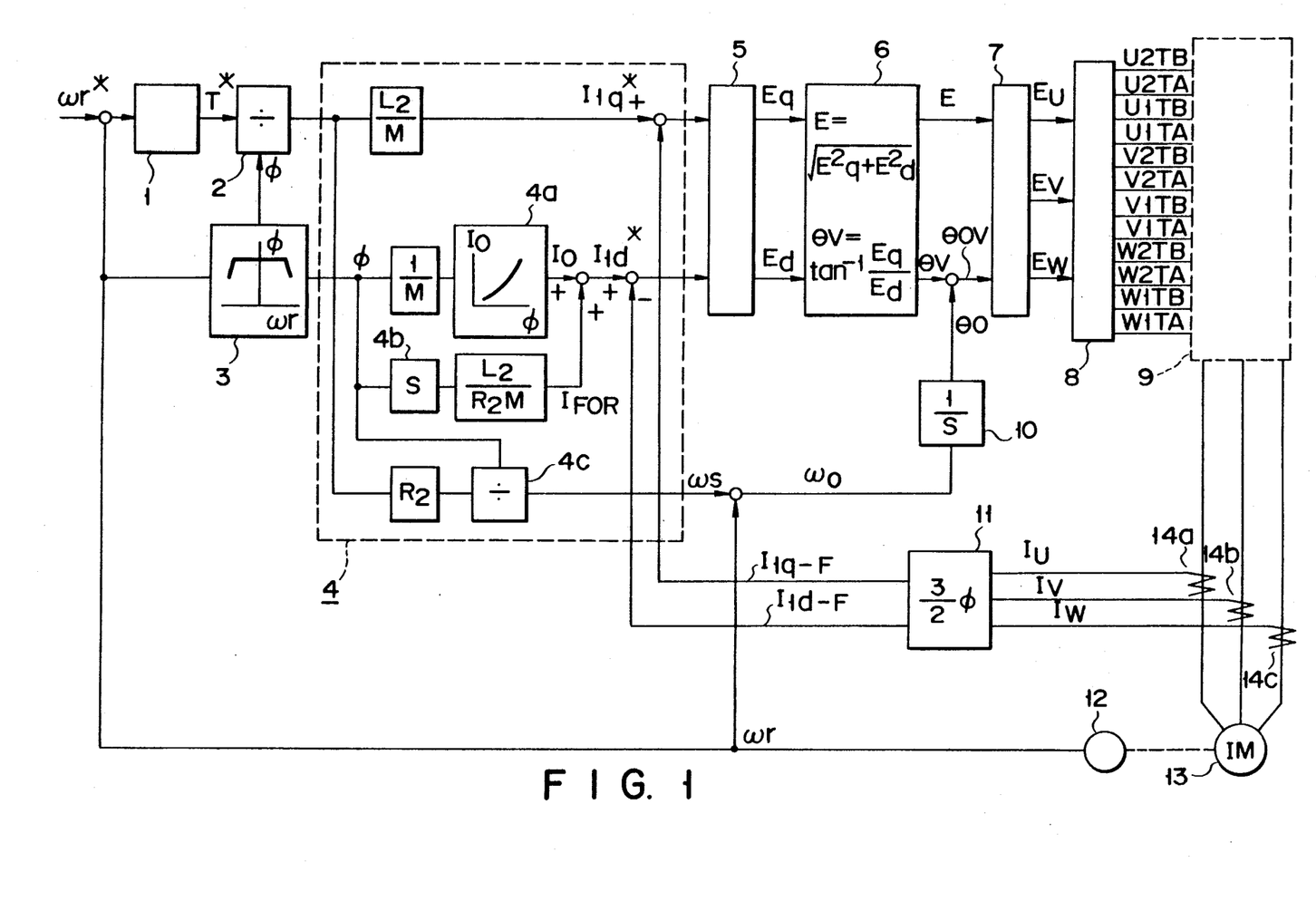
FIG. 1 is a functional block diagram for driving an induction motor by using a cycloconverter according to the present invention.

FIG. 1 shows a circuit arrangement for driving an induction motor by a cycloconverter according to an embodiment of the present invention.

Figure 2:
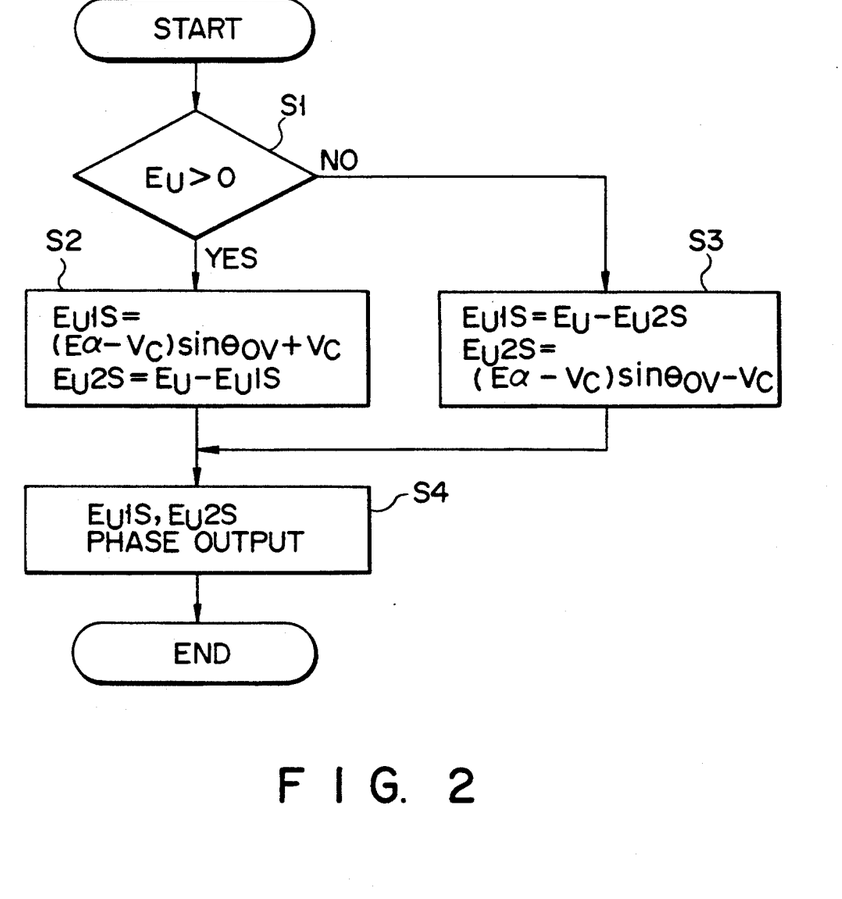
FIG. 2 is a flow chart for realizing a method of controlling the cycloconverter according to the present invention.

This cycloconverter is constituted by a reference voltage generator for generating a reference voltage signal determined in accordance with the frequency of an AC power to be subjected to frequency conversion, a controller 8 for converting the reference voltage signal into a firing signal on the basis of a flow chart shown in FIG. 2, and a main circuit 9 having a plurality of converters each having a firing angle controlled by the firing signal supplied from the controller 8. The arrangement of the main circuit 9 is the same as that shown in FIG. 6.

As will be described below, the reference voltage generator generates U-, V-, and W-phase reference voltage signals $E_u$, $E_v$, and $E_w$ having phases shifted through 120° from each other and outputs the generated signals to the controller 8.

Figure 5:
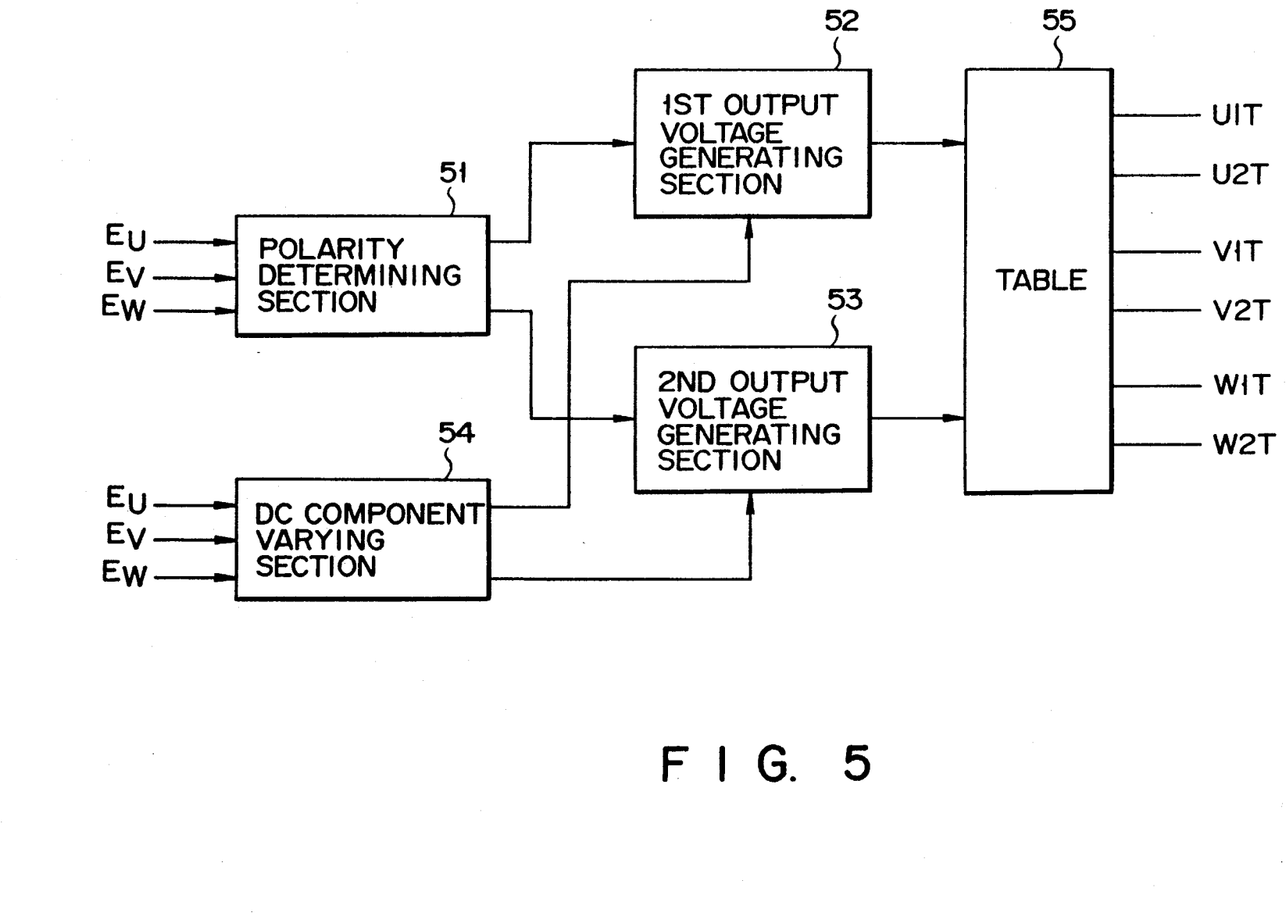
FIG. 5 is a functional block diagram showing a control unit of the cycloconverter according to the present invention.

The controller 8 has functional blocks shown in FIG. 5 and operates on the basis of the flow chart shown in FIG. 2. The operation of the controller 8 will be described below by taking a U phase as an example.

When the reference voltage signal $E_u$ having an AC waveform shown in FIG. 4 is input, the controller 8 starts processing shown in step S1 of FIG. 2. In step S1, a polarity determining section 51 determines a current polarity of the input signal. If the reference voltage signal $E_u$ falls within the range of the positive polarity, the flow advances to step S2, and a first output voltage generating section 52 generates first and second voltage signals $E_u1S$ and $E_u2S$. The signals $E_u1S$ and $E_u2S$ are obtained by the following equations:

$$E_u1S = (E_a - V_c)\sin\theta_{ov} + V_c$$

$$E_u2S = E_u - E_u1S$$

where $E_a$ is the maximum output voltage of the converter, $V_c$ is the DC voltage component, $\theta_{ov}$ is the voltage phase of the reference voltage signal $E_u$.

If the polarity of the reference voltage signal Eu falls within the range of the negative polarity, the flow advances to step S3, and a second output voltage generating section 53 generates the first and second voltage signals $E_u1S$ and $E_u2S$. In this case, the signals $E_u1S$ and $E_u2S$ are calculated as follows:

$$E_u1S = E_u - E_u2S$$

$$E_u2S=(E\alpha-Vc)\sin\theta ov-Vc$$

Figure 3:
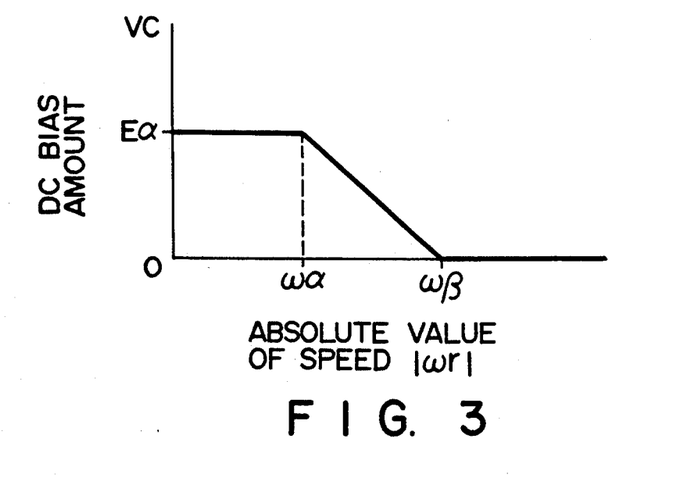
FIG. 3 is a graph showing a relationship between a speed and a DC bias Vc for explaining an operation of the present invention.

Note that the DC voltage component used in the arithmetic operation performed in steps S2 and S3 is varied by a DC component varying section 54 as a function of the speed of an induction motor 13. For example, as shown in FIG. 3, the DC voltage component Vc is set at the maximum output voltage E$\alpha$ when the speed is set from 0 to a low-frequency operation speed $\omega\alpha$, continuously decreased from E$\alpha$ to 0 when the speed is set from the low-frequency operation speed $\omega\alpha$, to a high-frequency operation speed $\omega\beta$, and set at 0 when the speed is set at the high-frequency operation speed $\omega\beta$ or higher. Although $\omega\alpha$ and $\omega\beta$ can be arbitrarily set within the range of $0<\omega\alpha<\omega\beta$, the frequency $\omega\alpha$ is set within a frequency range where asymmetrical control can be performed without any problem for an output voltage distortion of the cycloconverter, and the high-speed operation frequency $\omega\beta$ is set within a frequency range applicable to the system, wherein the output voltage waveform is distorted unless symmetrical control is executed. The speed of the induction motor 13 is in proportion to the frequency of the reference voltage signal $E_u$. That is, if the speed is increased, the frequency of the reference voltage signal is increased, and vice versa.

When the first and second voltage signals $E_u1S$ and $E_u2S$ are generated in step S2 or S3, the flow advances to step S4. In step S4, The signals $E_u1S$ and $E_u2S$ are converted into firing signals corresponding to their voltage levels by a table 55. That is, when the first voltage signal $E_u1S$ is input, the table 55 outputs firing signals U1TA and U1TB which allow a synthetic output voltage ($\frac{1}{2}$) (U1SA+U1SB) of two converters in the first stage to be the first voltage signal $E_u1S$. Similarly, when the second voltage signal $E_u2S$ is input, the table 55 outputs firing signals U2TA and U2TB which allow a synthetic output voltage ($\frac{1}{2}$)(U2SA+U2SB) of two converters in the second stage to be the second voltage signal $E_u2S$. The signals U1TA and U1TB are supplied to the two converters in the first stage. The signals U2TA and U2TB are supplied to the two converters in the second stage.

The arrangement of the reference signal generator is shown in detail in FIG. 1.

In the reference generator, as shown in FIG. 1, a deviation between an externally supplied speed reference $\omega r^*$ and a real speed $\omega r$ of the induction motor 13 detected by a speed detector 12 is input to a speed controller 1. The speed controller 1 executes a PID arithmetic operation for the input deviation to obtain a torque reference T* and outputs the obtained reference T to a divider 2. When the input real speed $\omega r$ of the induction motor 13 reaches a predetermined value, a flux arithmetic operation unit 3 calculates a flux reference $\phi$ for decreasing the speed in accordance with an inverse proportional function. The divider 2 divides the torque reference T* by the flux reference $\phi$ and supplies the quotient to a vector controller 4.

On the basis of the output from the divider 2 and the flux reference $\phi$, the vector controller 4 decomposes the primary current of the induction motor 13 into a torque current component $I_{lq}^*$ and a flux current component $I_{ld}^*$ by using the constants (a secondary resistance R2, a secondary inductance L2, and a mutual inductance M) of the induction motor 13.

That is, the controller 4 multiplies the output from the divider 2 by $L_2/R_2M$ to generate the torque current component $I_{lq}^*$. In addition, the controller 4 divides the flux reference $\phi$ by the mutual inductance M and supplies the quotient to a flux saturation function circuit 4a. In accordance with a relationship between the flux reference $\phi$ of the induction motor 13 and an excitation current Io, the circuit 4a calculates the excitation current Io in consideration of saturation of the magnetic flux. In addition, a differentiator 4b differentiates the flux reference $\phi$ and multiplies the differential result by $L_2/R_2M$ to obtain a forcing current $I_{FOR}$. This current $I_{FOR}$ compensates for a delay when the magnetic flux changes. The sum of the forcing current $I_{FOR}$ and the excitation current Io is the flux current component $I_{lg}^*$.

In addition, a slip frequency reference $\omega s$ of the induction motor 13 is calculated by dividing the product of the output from the divider 2 and the secondary resistance R2 by the flux reference $\omega$.

Current detectors 14a, 14b, and 14c detect input currents $I_u$, $I_v$, and $I_w$ of the motor 13, respectively. These input currents are decomposed into two-phase DC amounts $I_{lq-F}$ and $I_{ld-F}$ by a three-phase/two-phase converter 11.

A deviation between the torque current component $I_{lq}^*$ an output from the vector controller 4 and the real current $I_{q-F}$ and that between the flux current component $I_{ld}^*$ and the real current $I_{ld-F}$ are supplied to a current controller 5 constituted by proportional-plus-integral control elements.

The controller 5 independently executes proportional-plus-integral control for the deviation between the torque current component and the real current and that between the flux current component and the real current to obtain voltage references Eq and Ed and outputs the obtained references Eq and Ed to a voltage vector arithmetic operation unit 6.

The unit 6 uses the voltage references Eq and Ed to calculate a voltage amplitude reference E and a voltage phase $\theta v$ in accordance with the following arithmetic operations:

$$E = \sqrt{Eq^2 + Ed^2}$$

$$\theta v = \tan^{-1}(Eq/Ed)$$

A primary frequency $\omega o$ as the sum of the real speed $\omega r$ and the slip frequency reference $\omega s$ is converted into a primary frequency phase $\theta o$ via an integrator 10, and a voltage phase 8 from a voltage reference fixed winding is calculated on the basis of the primary frequency phase $\theta$ and the voltage phase $\theta v$. The calculated voltage phase $\theta$ and the above voltage amplitude reference E are supplied to a three-phase reference arithmetic operation unit 7. The unit 7 executes the following arithmetic operations to output the reference voltage signals $E_u$, $E_v$, and $E_w$ of three phases U, V, and W, respectively, consisting of sine waves having phases shifted through 120° from each other:

$$E_u = E\sin\theta ov$$

$$E_v = E\sin(\theta ov - \tfrac{2}{3}\pi)$$

$$E_w = E\sin(\theta ov + \tfrac{2}{3}\pi)$$

The operation of the cycloconverter having the above arrangement will be described below with reference to FIG. 4.

Figure 4A:
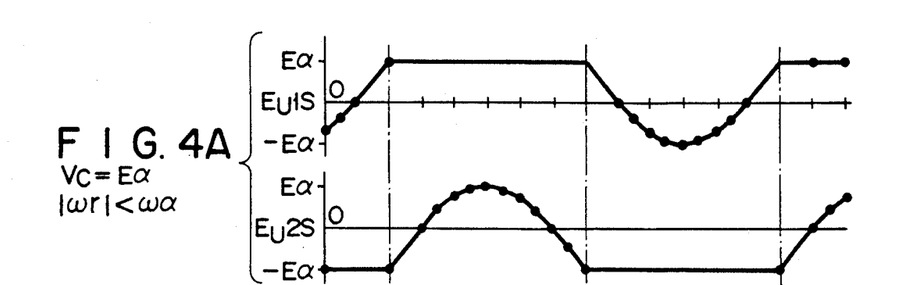
FIG. 4A is a timing chart for explaining an operation of the cycloconverter according to the present invention, showing first and second output voltage signals obtained in asymmetrical control.
Figure 4B:
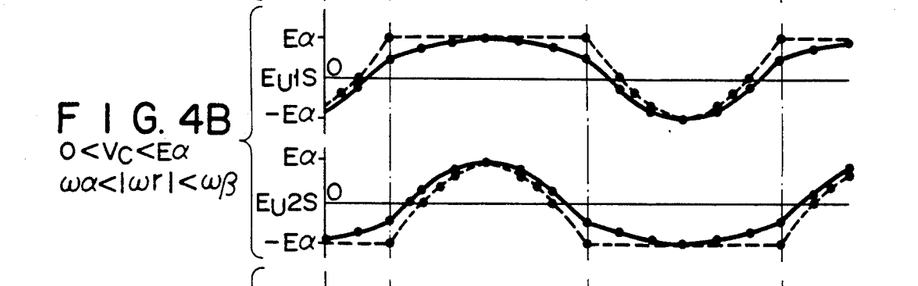
FIG. 4B is a timing chart for explaining an operation of the cycloconverter according to the present invention, showing the first and second output voltage signals obtained while asymmetrical control transits to symmetrical control or vice versa.

The reference voltage signal $E_u$ calculated as described above is input to the controller 8. The controller 8 executes asymmetrical control within the range of $|\omega r| \leq \omega\alpha$ and symmetrical control within the range of $|\omega r| \geq \omega\beta (>0)$. Within the range of $\omega\alpha \leq \omega r \leq \omega\beta$, in order to continuously, smoothly switch control for the output voltage in each stage from the asymmetrical to symmetrical control, the controller 8 calculates the reference voltage signals $E_u 1S$ and $E_u 2S$ on the basis of the flow chart shown in FIG. 2:

if $E_u \geq 0$, $E_u 1S = (E\alpha - Vc) \sin\theta ov + Vc$ $E_u 2S = E_u - E_u 1S$ if $E_u < 0$, $E_u 1S = E_u - E_u 2S$ $E_u 2S = (E\alpha - Vc) \sin\theta ov - Vc$ Since Vc satisfies $Vc = E\alpha$ within the range of $|\omega r| \leq \omega\alpha$, the reference voltage signals $E_u 1S$ and $E_u 2S$ have voltage waveforms shown in FIG. 4A. That is, the firing angle of converters 24 and 26 in the first stage are controlled such that their output voltages become the signal $E_u 1S$, and those of converters 23 and 25 in the second stage are controlled such that their output voltages become the signal $E_u 2S$. Therefore, the AC power supplied from the U-phase converter unit to the induction motor 13 has the same sine wave as that of the reference voltage signal $E_u$ shown in FIG. 4D. Note that in the asymmetrical control, the firing angles of the converters in the first and second stages of the U-phase converter unit are controlled such that the output voltages from the two stages become the reference voltage signals $E_u 1S$ and $E_u 2S$ shown in FIG. 4A, respectively.

Figures 4C, 4D:
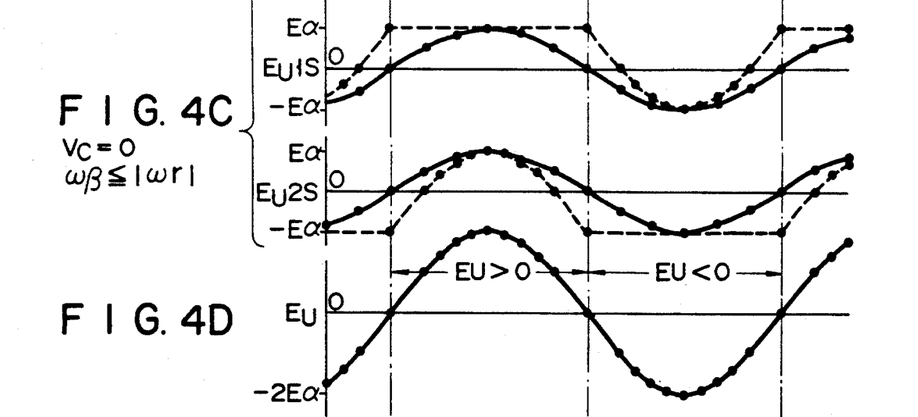
FIG. 4C is a timing chart for explaining an operation of the cycloconverter according to the present invention, showing the first and second output voltage signals obtained in symmetrical control.
FIG. 4D is a timing chart showing a reference voltage signal of the cycloconverter according to the present invention.

Since Vc satisfies $Vc = 0$ within the range of $|\omega r| \geq \omega\beta$, the reference signals $E_u 1S$ and $E_u 2S$ have voltage waveforms shown in FIG. 4C. That is, the reference voltage signals $E_u 1S$ and $E_u 2S$ have the identical symmetrical waveforms, and the firing angles of the converters 24 and 26 in the first stage and the converters 23 and 25 in the second stages are controlled such that their output voltages become $E_u 1S$ and $E_u 2S$, respectively. Therefore, the AC power supplied from the U-phase converter unit to the induction motor 13 has the same sine wave as that of the reference voltage signal $E_u$ shown in FIG. 4D. Note that the control as described above is the symmetrical control.

Vc varies from $Vc = E\alpha$ to $Vc = 0$ within the range of $\omega\alpha \leq \omega r \leq \omega\beta$. That is, the firing angles of the converters in the first and second stages are controlled so that the output voltages $E_u 1S$ and $E_u 2S$ in the first and second stages of the U-phase converter unit have voltage waveforms shown in FIG. 4B in accordance with the speed as shown in FIG. 3, thereby obtaining the reference voltage signal $E_u$ as a synthetic voltage of the two converter outputs, i.e., a voltage to be supplied to the motor 13.

As a result, the asymmetrical control can be switched to the symmetrical control and vice versa without distorting the output voltage to be supplied to the induction motor 13. In addition, a stable operation can be realized in a high-speed operation range.

Although the operation has been described above by taking the U-phase output voltage as an example, the output voltage can be similarly determined with respect to the V or W phase.

As has been described above, according to the present invention, there is provided a cycloconverter capable of improving the input power factor in a low-speed operation range and realizing a stable operation up to a high-speed operation range without distorting the output voltage and a method of controlling the same.

Although the cycloconverter of the present invention is applied to a frequency converting apparatus of an induction motor in the above embodiment, the present invention is not limited to the above embodiment.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A cycloconverter comprising:
    a converter group, having at least two cascade-connected converters for controlling a firing angle of each of said converter to convert an AC power given to each of said converters into an AC power having an arbitrary frequency;
    reference voltage generating means for generating a reference voltage signal having a frequency corresponding to the frequency of the AC power to be output from said converter group;
    first output voltage generating means for generating a first voltage signal obtained by adding a DC voltage to an AC signal having an amplitude corresponding to a difference between a maximum output voltage of said converter and the DC voltage, and a second voltage signal obtained by subtracting the first voltage signal from the reference voltage signal;
    second output voltage generating means for generating a third voltage signal obtained by subtracting the DC voltage from an AC signal having an amplitude corresponding to a difference between the DC voltage and the maximum output voltage of said converter, and a fourth voltage signal obtained by subtracting the third voltage signal from the reference voltage signal;
    DC component varying means for varying the DC voltage in accordance with the frequency of the reference voltage signal;
    first firing angle control means for supplying, while the reference voltage signal is positive, a firing signal corresponding to a voltage value of the first voltage signal to one of said converters and a firing signal corresponding to a voltage value of the second voltage signal to the other of said converters; and
    second firing angle control means for supplying, while the reference voltage signal is negative, a firing signal corresponding to a voltage value of the third voltage signal to said the other said converters and a firing signal corresponding to a voltage value of the fourth voltage signal to said one of said converters.

2. A cycloconverter according to claim 1, wherein said DC component varying means includes means for continuously decreasing the DC voltage when the frequency of the reference voltage signal changes from a first frequency to a second frequency higher than the first frequency and continuously increasing the DC voltage when the frequency changes from the second frequency to the first frequency.

3. A cycloconverter according to claim 2, wherein said DC component varying means includes means for fixing the DC voltage at the maximum output voltage of said converter when the frequency of the reference voltage signal is lower than the first frequency.

4. A cycloconverter according to claim 2, wherein said DC component varying means includes means for fixing the DC voltage at 0 while the frequency of the reference voltage signal is higher than the second frequency.

5. A cycloconverter according to claim 1, wherein said converter group outputs the frequency-converted AC power to a motor, and
said DC component varying means varies the DC voltage in accordance with an operation frequency of said motor.

6. A cycloconverter according to claim 1, wherein said converter group includes a plurality of positive converters through which a positive component of an AC current supplied to said converter group flows and plurality of a negative converters through which a negative component of the AC current flows.

7. A cycloconverter according to claim 6, wherein each of said positive and negative converters is constituted by at least one thyristor.

8. A cycloconverter according to claim 1, wherein a cyclic current flows from said positive converters to said negative converters in said converter group.

9. A cycloconverter according to claim 1, wherein said voltage reference generating means includes flux arithmetic operating means for calculating a flux reference of a motor which receives the AC power output from said converter group in accordance with a real speed of the motor, means for calculating a torque reference of the motor in accordance with an externally supplied speed reference and the real speed, means for calculating a torque current component and a flux current component in accordance with the flux reference and the torque reference, means for detecting a real current as an input current to the motor and converting the detected current into two-phase real currents, means for executing proportional-plus-integral control for a deviation between one of the real currents generated by said converting means and the torque current component and a deviation between the other real current generated by said converting means and the flux current component and outputting an arithmetic operation result signal, means for calculating a voltage amplitude reference and a voltage phase in accordance with the arithmetic operation result signal output from said proportional- plus-integral control means, means for calculating a primary frequency phase in accordance with the real speed and a slip frequency reference of said motor, means for calculating a phase of the voltage reference in accordance with the voltage phase and the primary frequency phase, and means for calculating the voltage reference in accordance with the phase calculated by said phase calculating means and the voltage amplitude reference.

10. A method of controlling a cycloconverter, for supplying an AC power having a given frequency to a converter group including at least two cascade-connected converters and controlling a firing angle of each of the converters, thereby converting the AC power supplied to the converter group into an AC power having a predetermined frequency, said method comprising the steps of:

generating a first voltage signal and a second voltage signal, said first voltage signal having a voltage phase equal to that of a reference voltage signal of a predetermined frequency and being obtained by adding a DC voltage to an AC signal whose amplitude corresponds to a difference between the DC voltage and a maximum output voltage of the converters, said second voltage signal being obtained by subtracting the first voltage signal from the reference voltage signal;

generating a third voltage signal and a fourth voltage signal, said third voltage signal having a voltage phase equal to that of the reference voltage signal and being obtained by subtracting the DC voltage from an AC signal whose amplitude corresponds to said difference between the DC voltage and the maximum output voltage of the converters, said fourth voltage signal being obtained by subtracting the third voltage signal from the reference voltage signal;

varying the DC voltage in accordance with the frequency of the reference voltage signal;

supplying a first firing signal corresponding to a voltage value of the first voltage signal to one of the converters when the reference voltage signal is positive, and supplying a second firing signal corresponding to a voltage value of the second voltage signal to said one of the converters when the reference voltage signal is negative, whereby an output voltage of said one of the converters of the converter group is an AC voltage including a composite voltage between a predetermined voltage and an AC voltage whose amplitude corresponds to a difference between a DC voltage and the maximum output voltage of the converters; and supplying a firing signal corresponding to a voltage value of the second voltage signal to another one of the converters when the reference voltage signal is positive, and supplying a firing signal corresponding to a voltage value of the third voltage signal to said another one of the converters when the reference voltage signal is negative, whereby an output voltage of said another one of the converters of the converter group is an AC voltage obtained by subtracting an output voltage of said one of the converters from the reference voltage signal.

11. A method according to claim 10, further comprising:

an asymmetrical control step of controlling the output voltage of said one of the converters of the converter group to be equal to the maximum output voltage of said one of the converters, and of controlling the output voltage of said another one of the converters of the converter group to be equal to an AC output voltage obtained by subtracting the maximum output voltage from the reference voltage signal;

a symmetrical control step of controlling the output voltage of each of said one converter and said another converter such that the output voltages have voltage values about ½ that of the reference voltage signal; and a switching step of executing switching between the asymmetrical and symmetrical control steps in accordance with a distortion in the output voltage supplied from the converter group.

* * * * *